(12) United States Patent
Tischer et al.

(10) Patent No.: US 8,065,709 B2
(45) Date of Patent: Nov. 22, 2011

(54) METHODS, SYSTEMS, AND COMPUTER PROGRAM PRODUCTS FOR PROVIDING MULTI-VIEWPOINT MEDIA CONTENT SERVICES

(75) Inventors: Steven Tischer, Atlanta, GA (US); Jerry Chieh Liu, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 611 days.

(21) Appl. No.: 11/413,864

(22) Filed: Apr. 28, 2006

(65) Prior Publication Data
US 2006/0195882 A1 Aug. 31, 2006

Related U.S. Application Data

(63) Continuation-in-part of application No. 10/785,914, filed on Feb. 24, 2004.

(51) Int. Cl.
*H04N 7/173* (2011.01)
*H04N 7/14* (2006.01)
*G06F 3/00* (2006.01)

(52) U.S. Cl. .......... 725/105; 725/99; 725/114; 725/131; 715/756; 348/14.02

(58) Field of Classification Search ............... 348/14.02; 715/756; 725/99, 105, 114, 131
See application file for complete search history.

(56) References Cited

U.S. PATENT DOCUMENTS

| | | | |
|---|---|---|---|
| 4,870,700 A | 9/1989 | Ormanns et al. | |
| 5,680,441 A | 10/1997 | Gallo | |
| 5,926,101 A | 7/1999 | Dasgupta | |
| 6,697,103 B1 | 2/2004 | Fernandez et al. | |
| 6,809,760 B1 | 10/2004 | Takagi et al. | |
| 6,947,071 B2 | 9/2005 | Eichmann | |
| 6,956,614 B1 | 10/2005 | Quintana et al. | |
| 7,079,176 B1 * | 7/2006 | Freeman et al. | ........... 348/207.1 |
| 7,266,396 B2 | 9/2007 | Terzian et al. | |
| 7,321,387 B2 | 1/2008 | Norvais et al. | |
| 7,323,991 B1 | 1/2008 | Eckert et al. | |
| 7,370,077 B2 | 5/2008 | Pradhan et al. | |
| 7,382,798 B2 | 6/2008 | Sugaya | |
| 7,426,197 B2 | 9/2008 | Schotten et al. | |
| 7,501,934 B2 | 3/2009 | Tischer | |
| 2001/0026552 A1 | 10/2001 | Spratt et al. | |
| 2001/0045978 A1 | 11/2001 | McConnell et al. | |
| 2002/0009971 A1 | 1/2002 | Spratt | |
| 2002/0039135 A1 | 4/2002 | Heyden | |
| 2002/0093493 A1 | 7/2002 | Michaeli et al. | |
| 2003/0067542 A1 | 4/2003 | Monroe | |
| 2003/0093797 A1 | 5/2003 | Bazzaz | |
| 2003/0097397 A1 | 5/2003 | Giannetti | |
| 2003/0117316 A1 | 6/2003 | Tischer | |
| 2004/0029582 A1 | 2/2004 | Swab et al. | |
| 2004/0074448 A1 | 4/2004 | Bunt et al. | |
| 2004/0156616 A1 * | 8/2004 | Strub et al. | ...................... 386/46 |

(Continued)

*Primary Examiner* — Hunter B. Lonsberry
*Assistant Examiner* — John Schnurr
(74) *Attorney, Agent, or Firm* — Cantor Colburn LLP

(57) ABSTRACT

A method, system, and computer program product for providing multi-viewpoint media content services is provided. The method includes receiving a feed of content from at least one communications device that is observing an event from a specified viewpoint and/or relaying the feed of content received from another communications device. The method also includes classifying the content according to a viewpoint identifier and a content identifier. The content identifier specifies a defined portion of the event. The method further includes providing access to user-selectable viewpoints of the content via a corresponding viewpoint identifier and content identifier. Content of selected viewpoints is modifiable for creating customized content.

24 Claims, 10 Drawing Sheets

U.S. PATENT DOCUMENTS

| | | |
|---|---|---|
| 2005/0135286 A1 | 6/2005 | Nurminen et al. |
| 2005/0188399 A1 | 8/2005 | Tischer |
| 2006/0046719 A1 | 3/2006 | Holtschneider |
| 2006/0062175 A1 | 3/2006 | Ling et al. |
| 2006/0074645 A1 | 4/2006 | Tischer |
| 2006/0128447 A1 | 6/2006 | Tischer et al. |
| 2006/0128477 A1 | 6/2006 | Cole |
| 2006/0209744 A1 | 9/2006 | Tischer |

* cited by examiner

MULTI-VIEWPOINT MEDIA ACCESS SYSTEM

MAIN MENU
SELECT FROM THE FOLLOWING OPTIONS:

REGISTER FOR CONTENT SERVICE

EDIT EXISTING CONTENT SERVICE

HELP

NEW USER/REGISTRATION

ENTER YOUR PERSONAL INFORMATION BELOW:

NAME_____

ADDRESS_____

SELECT FROM THE FOLLOWING SERVICES:

PREMIUM PACKAGE
STANDARD PACKAGE
BASIC PACKAGE

PREMIUM PACKAGE INCLUDES ONE-YEAR UNLIMITED ACCESS TO ALL MEDIA CONTENT FOR ALL EVENTS PRESENTED AT THIS ARENA

*FIG. 4*

METHODS, SYSTEMS, AND COMPUTER PROGRAM PRODUCTS FOR PROVIDING MULTI-VIEWPOINT MEDIA CONTENT SERVICES

CROSS-REFERENCE TO RELATED APPLICATIONS

This application is filed under 37 CFR §1.53(b) as a Continuation-in-Part of U.S. patent application Ser. No. 10/785,914, filed on Feb. 24, 2004 and claims priority thereto. This application is also related to commonly assigned U.S. patent application Ser. No. 11/413,304, entitled METHODS, SYSTEMS, AND COMPUTER PROGRAM PRODUCTS FOR PROVIDING MULTI-VIEWPOINT MEDIA COLLABORATION SERVICES, filed on Apr. 28, 2006. The above-referenced applications are incorporated by reference herein in their entireties.

BACKGROUND

The present invention relates generally to content management and related services, and more particularly, to methods, systems, and computer program products for providing multi-viewpoint media content services.

When groups of people gather together for an event such as a music concert, they often call friends on their cellular telephones to share the concert experience in real time via the telephone or similar mobile communications device. With the recent proliferation of mobile communications devices, this type of behavior is becoming more prevalent whereby event attendees raise their devices in the direction of the event in order to broadcast the audio and/or video content to the respective calling-receiving parties.

Capturing various viewpoints of an event can provide interesting and unique perspectives of the event that are generally not available to the viewing audience as a whole. Oftentimes, activities occurring during the event, which are not the intended focus of the event, can be more interesting than the actual event itself. A limited population of event-goers in a relatively large event arena are often exposed to interesting 'localized' activities, e.g., exuberant attendees, unintended incidents, etc., that are not visible to many attendees situated a distance from the incidents. Thus, most event-goers are not able to fully appreciate the event experience as a whole. In addition, the general public (non-event goers) may be interested in the event, as well as the points of view captured by the event-goers.

What is needed, therefore, is a way to provide multi-viewpoint media content services that allow individuals to access event-related content taken from multiple points of view via communications devices utilized by event-goers as well as a production system managing the event. What is also needed is a way to manage the receipt and processing of the content from these communications devices that facilitates access to the event-related content.

BRIEF SUMMARY

The above-stated shortcomings and disadvantages are overcome or alleviated by methods, systems, and computer program products for providing multi-viewpoint media content services.

The method includes receiving a feed of content from at least one communications device that is observing an event from a specified viewpoint and/or relaying the feed of content received from another communications device. The method also includes classifying the content according to a viewpoint identifier and a content identifier. The content identifier specifies a defined portion of the event. The method further includes providing access to user-selectable viewpoints of the content via a corresponding viewpoint identifier and content identifier. Content of selected viewpoints is modifiable for creating customized content.

The system includes a computer processing device in communication with at least one communications device over a network. The system also a multi-viewpoint media access application executing on the computer processing device. The multi-viewpoint media access application performs a method. The method includes receiving a feed of content from at least one communications device that is observing an event from a specified viewpoint and/or relaying the feed of content received from another communications device. The method also includes classifying the content according to a viewpoint identifier and a content identifier. The content identifier specifies a defined portion of the event. The method further includes providing access to user-selectable viewpoints of the content via a corresponding viewpoint identifier and content identifier. Content of selected viewpoints is modifiable for creating customized content.

The computer program product includes instructions for executing a method. The method includes receiving a feed of content from at least one communications device that is observing an event from a specified viewpoint and/or relaying the feed of content received from another communications device. The method also includes classifying the content according to a viewpoint identifier and a content identifier. The content identifier specifies a defined portion of the event. The method further includes providing access to user-selectable viewpoints of the content via a corresponding viewpoint identifier and content identifier. Content of selected viewpoints is modifiable for creating customized content.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 4 is a sample user interface provided by the multi-viewpoint media access system as seen by a user of the system in exemplary embodiments;

DETAILED DESCRIPTION OF EXEMPLARY EMBODIMENTS

In accordance with exemplary embodiments, a multi-viewpoint media access system is provided. The multi-viewpoint media access system enables media content sharing among portable communication devices that are proximally located, using optimal (e.g., best effort) peer-to-peer discovery and transmission exchange processes, as well as a multi-networking relay system for enhanced media content transmission and value-added services. The multi-viewpoint media access system discovery processes may include portable communications device sensors that identify signals transmitted by other compatible portable communications devices for initiating an exchange of content. A portable communications device 'auditions' one or more 'discovered' portable communications devices to determine an optimal vantage point and may select the desired portable communications device (i.e., originating portable communications device) from which a transmission feed is executed. The multi-viewpoint media access system further enables the receiving portable communications device to share the content received from the originating portable communications device to a third portable communications device. The third portable communications device may be proximally located to the receiving portable communications device or may be a remote device. Portable communications devices may include cellular telephones, digital camera phones, video camera phones, personal digital assistants (PDAs), and other handheld communications devices. The multi-viewpoint media access system may be implemented using a variety of wireless and wireline networking technologies such as a packet-switched network, a cellular network, a public switched telephone network (PSTN), and may include available technologies such as satellite, global positioning, and other resources. These, and other features of the multi-viewpoint media access system will now be described.

Figure 1:
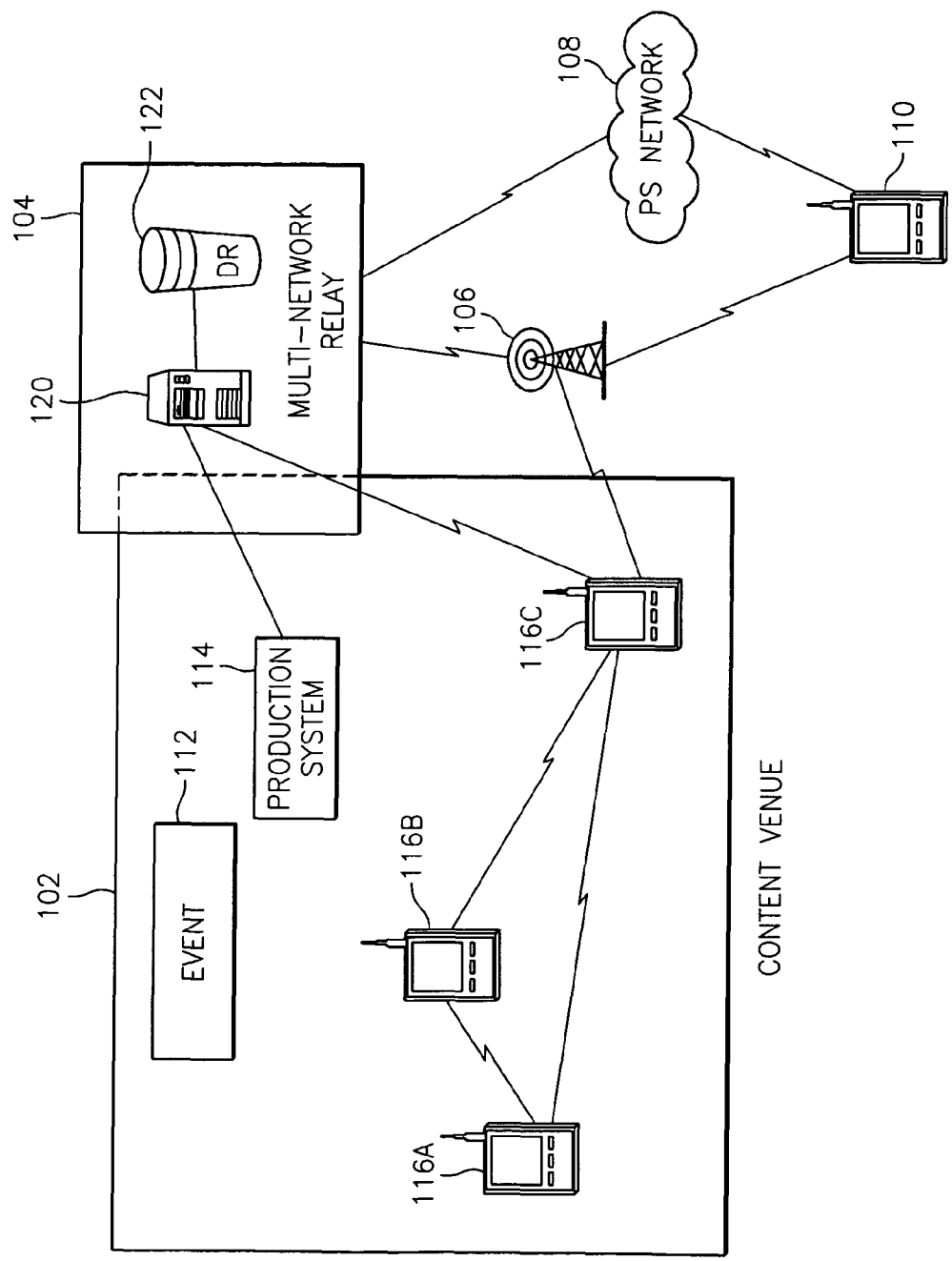
FIG. 1 is a block diagram of a system upon which the multi-viewpoint media access system may be implemented in exemplary embodiments.

Referring now to FIG. 1, an exemplary system upon which the multi-viewpoint media access system may be implemented is depicted. FIG. 1 includes a content venue 102, a multi-network relay system 104, and a remote communications device 110 in communication with one another via a communications network such as a cell tower 106, public-switched telephone network (not shown), and/or Internet 108, to name a few.

In exemplary embodiments, content venue 102 represents a physical location whereby a planned event 112 is conducted for the benefit of event-goers. Content venue 102, for example, may be a stadium and event 112 is a sporting event. In another example, content venue 102 may be a concert hall and event 112 is a musical event or concert. However, it will be understood by those skilled in the art that content venue 102 may also include a location in which an unplanned event has occurred (or is in the process of occurring) such as a natural disaster, a terrorist attack, an emergency situation, or other unscheduled event whereby groups of people are gathered and may benefit from receiving an alternate feed of media content in order to assess the risks involved relating to the unplanned event. For example, in a building fire, occupants may share content (in a peer-to-peer fashion) in order to determine the safest possible exit location and/or exit route with respect to the occupants' current location at a given time.

Also included in content venue 102 are portable communications devices 116A-C. While only three portable communications devices are shown in content venue 102, it will be understood that any number of portable communications devices may be present in order to realize the advantages of the invention. Users of portable communications devices 116A-C are typically event-goers for a planned event 112 or may be spectators/passers-by in proximity of an unplanned event 112 as described above. Types of portable communications devices 116A-C may include cellular telephones, personal digital assistants (PDAs), camera telephones, video telephones, or other portable wireless communications devices. The multi-viewpoint media access system may be executed entirely, or in part, on portable communications devices 116A-C via a user interface (e.g., FIG. 4) which, for example, may include a visual presentation of menu options presented on a device screen or may be audio options presented on a cellular telephone.

In alternate exemplary embodiments, one or more of portable communications devices 116A-C may comprise a information-generation component such as an accelerometer, altimeter, global positioning system, and sensor-based components such as temperature sensors, motion sensors, sound sensors, and biometric sensors, to name a few. Temperature sensors may measure internal or ambient temperatures, and sound sensors may measure volume, resonance, intonation, modulation, or other sound-based measurements. Motion-based sensors may include an infrared feature for detecting movement. Information produced via information-generation components may be transmitted among portable communication devices 116A-C and remote communication device 110 in addition to, or in lieu of, the media content described above with respect to event 112.

In exemplary embodiments, production system 114 comprises a high-powered camera system for capturing high-quality images, voice, data, etc., from event 112. In alternative embodiments, production system 114 may comprise a network of cameras dispersed around content venue 102, linked together by communications lines or cables. Where event 112 is unscheduled, production system 114 may or may not be present at content venue 102, depending upon the nature and duration of the unscheduled event. In this scenario, most of the features of the multi-viewpoint media access system are implementable in a peer-to-peer manner (e.g., via portable communications devices 116A-C and remote device 110) as will be described in FIG. 2A. If present, production system 114 may work in cooperation with multi-network relay system 104 to provide extended multi-viewpoint media access system services to portable communications devices 116A-116C and remote device 110 as described further in FIGS. 2-4.

FIG. 1 also includes multi-network relay system 104. In exemplary embodiments, multi-network relay system 104 represents a provider of multi-viewpoint media access system services for registered service members. Service members refer to users of portable communications devices 116A-C, and optionally remote communications device 110, that have registered with multi-network relay system 104 to obtain multi-viewpoint media access system services. For example, a portable communications device user (e.g., 116A) has poor seating at content venue 102 and desires to obtain high-quality media content of event 112. The quality of service possible from production system 114 is typically greater than that available to other portable communications device users at event 112 due, in part, because of the optimal location of production system 114 with respect to event 112 in addition to the advanced camera equipment used by production system 114. Multi-network relay system 104, working in conjunction with production system 114, is able to provide this higher quality content feed to portable communications device 116A. Thus, a basic service that may be provided by multi-network relay system 104 is a high-quality media content feed of event 112 to portable communications device 116A.

Through the registration process, other additional services may be offered and are contemplated by the multi-viewpoint media access system. For example, collaborative activities such as opinion polling associated with event 112 among event-goers with portable communications devices may be initiated whereby multi-network relay system 104 tallies votes and presents the results to registered portable communications device users. Contests or other incentives to register or maintain registration may be offered to portable communications device users. Registered service members may be able to vote on their favorite song where the event is a music concert, resulting in a performance of the winning song by the event performers. Another example may be selecting a winning contestant who is a registered service member to appear back stage to meet the event performers. Additionally, the media content may be interspersed with alternative content, such as recorded interviews of the event performers, event trivia, advertisements, etc.

Server 120 may comprise a high-speed processor such as a mainframe computer. Server 120 includes a web server for communicating with users of packet-switched portable communications devices with web browsers. Server 120 enables registration processes for portable communications devices (and optionally remote communications device 110) and maintains service member records in data repository 122. Service member records store personal information about the registered communications device users, as well as information about the type of communications devices that are registered in order to identify and facilitate multi-viewpoint media access system features and services in accordance with the communications devices' capabilities. Server 120 may also track multi-viewpoint media access system service usage for charging the service member and/or for marketing research. Data repository 122 stores service member records and comprises a data store that is logically addressable to server 120. As indicated above, the multi-viewpoint media access system may be executed entirely, or in part, on portable communications devices 116A-C via a user interface (e.g., FIG. 4) or may be executed by server 120, or a combination of both communications devices 116A-C, 110 and server 120.

Multi-network relay system 104 may be physically located at content venue 102 but is more likely to be remotely located from content venue 102.

Remote communications device 110 refers to a communications device remotely located from venue 102. Remote communications device 110 may be a portable or wireline telephone, a portable or wireline computer device such as a laptop, personal digital assistant, desktop computer, or other similar communications device. Further, remote communications device 110 may include one or more of the information-generation and sensor-based components described above with respect to portable communications devices 116A-C. Remote communications device 110 is in communication with one or more of portable communication devices 116A-C via a communications network such as cell tower 106, PSTN, or a packet-switched network such as Internet 108, etc.

Cell tower 106 comprises telecommunications equipment for enabling wireless communications among portable communications devices such as one or more of portable communications devices 116A-C and remote device 110. Packet-switched network 108 may be the Internet or other suitable network system capable of transmitting packet-switched data between communications devices.

The multi-viewpoint media access system of the invention may be implemented via a process as described in FIG. 2. While the process described in FIG. 2 represents execution of the multi-viewpoint media access system for multi-media portable communications devices (e.g., camera/video telephones), it will be understood that other media types may be shared using the multi-viewpoint media access system. Further, in addition to the media event 112, a variety of other types of information may be shared using the multi-viewpoint media access system. For example, a user of a portable communication device may transmit temperature information to another user or the sender's physical coordinates via a global positioning component of the invention.

The process begins at 200 and assumes that a portable communications device such as portable communications device 116A is in the process of capturing, or attempting to capture, media content for an event at venue 102 of FIG. 1. The process of FIG. 2 also assumes that the user of the portable communications device is interested in obtaining a different vantage point of the event via the portable communications device, either because the user's current vantage point is poor or because the user is simply seeking a different point of view. The user of portable communications device 116A searches for an alternate feed of media content for the event at 202. This step is referred to as the discovery process. Discovery can be accomplished using a variety of techniques. For example, discovery may occur using a multi-band device where an alternative part of spectrum transmits and discovers other devices. In other embodiments, discovery may occur using a telecommunications-centric registration scheme that determines which communications devices are close enough to assist one another as described in U.S. patent application Ser. No. 10/027,215, filed on Dec. 21, 2001, entitled "Systems and Methods for Locating and Tracking a Wireless Device", which is assigned to the assignees of the instant application and is incorporated herein by reference in its entirety. Embodiments further include sensors adapted to a portable communications device in which the user has elected to share media content with others. In this manner, the user pushes a button on the device that sends out a broadcast via peer networking which allows discovery of the device, as well as the discovery of similar preferences or potential.

At 204, it is determined whether one or more alternate feeds are available to the user of portable communications device 116A. If a search does not result in the discovery of an alternate feed at 204, the returns to step 202. This search may be iteratively performed indefinitely, for a set period of time, or for a set number of attempts before notifying the user that the search was unsuccessful. The user may opt to initiate a new search or wait a short time before re-instituting a search. For illustrative purposes, the available alternate feeds include devices 116B, 116C, and multi-network relay system 104. A list of alternate feeds available, namely 116B, 116C, and multi-network relay system 104 is presented to portable communications device 116A at 208. The user of portable communications device 116A selects from the list at 210.

At 212, it is determined whether the selection chosen by the user is multi-network relay system 104. If so, the process continues at 234 described in FIG. 2B. Otherwise, the user 'auditions' the selected alternate feed at 214. Auditioning refers to the act of evaluating the desirability of the content received from another source. Auditioning includes reviewing the alternate feed of media content for a limited amount of time. Before determining whether to accept the alternate feed being auditioned, the user may wish to audition other alternate feeds on the list, if present. At 216, it is determined whether the user wishes to continue auditioning. If so, the process returns to 208 whereby the alternate feed list is presented to the user. If the user does not wish to continue auditioning at 216, it is then determined whether the user wishes to view the media content via the alternate feed that was previously auditioned at 218. If not, the process ends at 220 and the user continues to experience the event via portable communications device 116A from the existing vantage point. If, on the other hand, the user decides to view the media content via the alternate feed previously auditioned, the user selects this feed from the alternate feed list at 222.

As indicated above, media content may be auditioned using information obtained by information-generation components of communications devices. For example, using a GPS-enabled communications device, a user may attempt to discover media content that originates from a second GPS-enabled communications device that resides at a specific location within venue 102 (e.g., center stage). In this manner, the user would audition only those location-specific feeds. Information generation components may also include altimeters, accelerometers, and sensor-based components as described above.

With respect to an unplanned event, such as the building fire described above, information-generation components could be used by a building occupant to 'audition' viable escape routes (from portable communications devices dispersed in various locations around the building) and select the route determined to have the least possible risk.

Once selected, the alternate feed of media content is transmitted from the selected portable communications device (e.g., 116B or 116C) presented to the user of portable communications device 116A at 224 for viewing. At 226, it is determined whether the user of portable communications device 116A desires to transmit the selected alternate feed of media content to another portable communications device. For example, the user of portable communications device 116A may wish to transmit the media content to another event-goer or to a remote communications device such as device 110. If the user of portable communications device 116A decides to transmit the alternate feed of media content to a third portable communications device at 226, the user enters the recipient portable communications device user's contact information into portable communications device 116A at 228 and initiates a communications transmission in accordance with the type of portable communications device used at 230. If the user does not wish to transmit the alternate feed of media content to another communications device, the process ends at 232.

As indicated above at 212, if the selected alternate feed is multi-network relay system 104, the process continues at 234 where it is determined whether the user is a registered service member. If not, the user so indicates via portable communications device 116A and a registration process is initiated at 236. The registration process includes submitting personal data to multi-network relay system 104 such as name, phone number, email address, or other contact information, and may include providing information regarding the type of portable communications device being registered. This portable communications device type information may be useful in determining which networking capabilities are compatible with the portable communications device, as well as its optional features and functions. As portable communications devices vary from manufacturer to manufacturer, and range in capabilities and features, this type of information may be helpful in assisting the user in selecting services provided by the media-sharing system as described further in step 238.

Alternate exemplary embodiments include providing registration and media content services described herein to remote communications device 110. Where remote communications device 110 represents a non-ticket holder, the extent of services offered to device 110 may be limited. Multi-relay network system 104 would distinguish ticket-holders (e.g., event-goers with tickets) from non-ticket holders (remote service members) using, for example, a rules-based process.

During the registration process, the user may be presented with a list of available services at 238. Services may include the ability to receive a higher quality of media content than that which may be possible via the user's device. Services may also include receiving supplemental content that is provided by multi-network relay system 104 such as advertising, special offers, discounts on venue merchandise, interactive or collaborative functions, premium services, and other content. Multi-network relay system 104 may provide multiple views of the venue activity, interspersed with special program materials such as interviews taken with the celebrity hosting the event, other attractions coming to the venue 102, screen shots of interesting or unusual attendees of the venue, contest offers, live opinion polls and poll results resulting from attendees' voting activities, etc. These functions may be accomplished using standardized media constructs such as MPEG 4/7/21 or similar protocol that allow for the identification, cataloging, indexing, archival, and retrieval of multimedia data.

At 240, media content for the event is transmitted via multi-network relay system 104 to portable communications device 116A. Alternatively, if the user is an existing registered service member at 234, the registration/services options are omitted and the user (i.e., service member) receives the media content at 240.

At step 242, it is determined whether advanced services were selected by the user of portable communications device 116A. If only a basic level of services was selected by the user, the process returns to 240 and the user continues to receive only the minimal level service (i.e., media content) and optionally, advertising information. If advanced services were selected by the user at 242, the user receives supplemental media content in accordance with the service level selected by the user at 244. The process returns to step 226 of FIG. 2A.

Figure 2A:
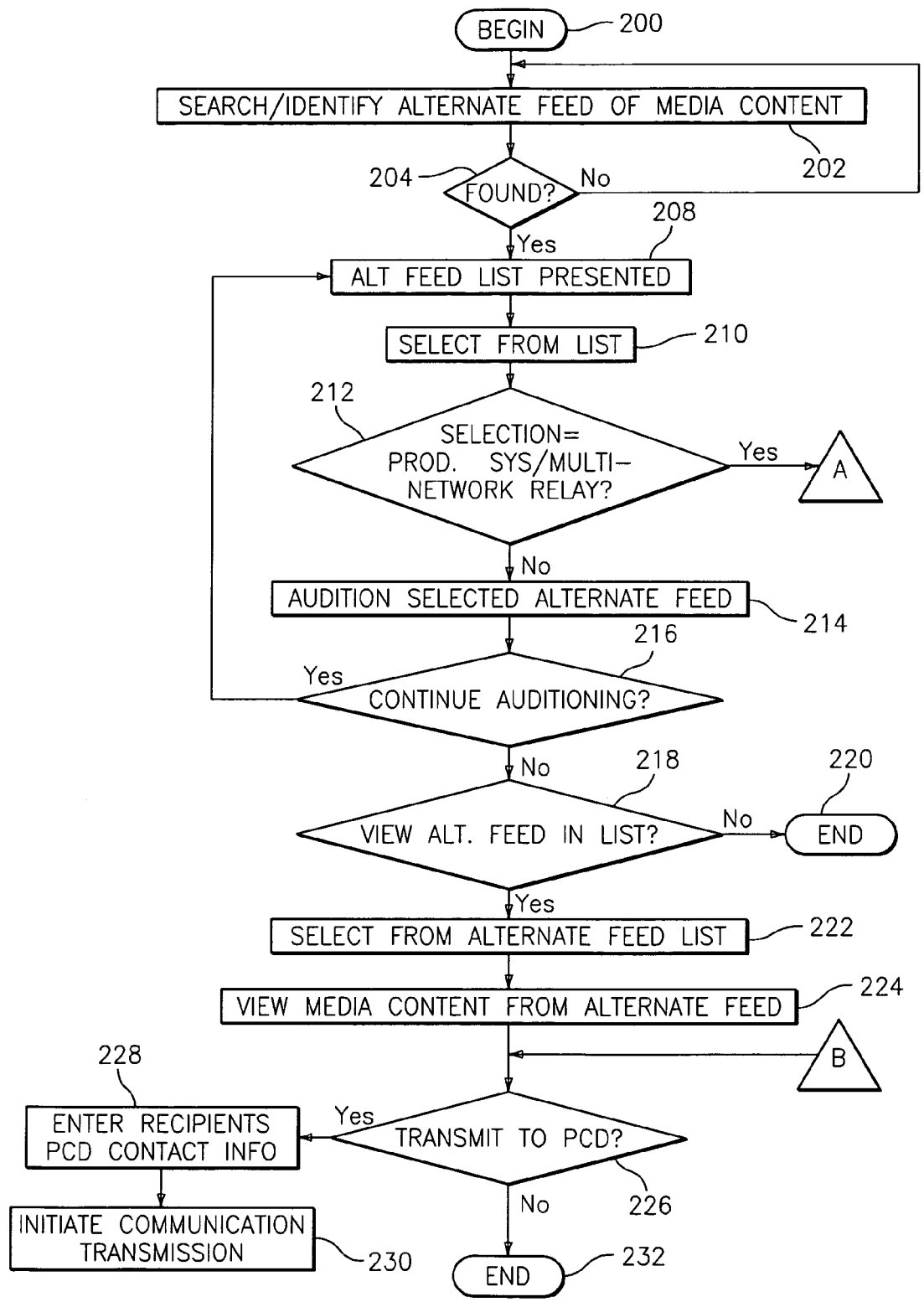
FIGS. 2A and 2B are flowcharts describing a process for implementing the multi-viewpoint media access system by a user of the system in exemplary embodiments.
Figure 2B:
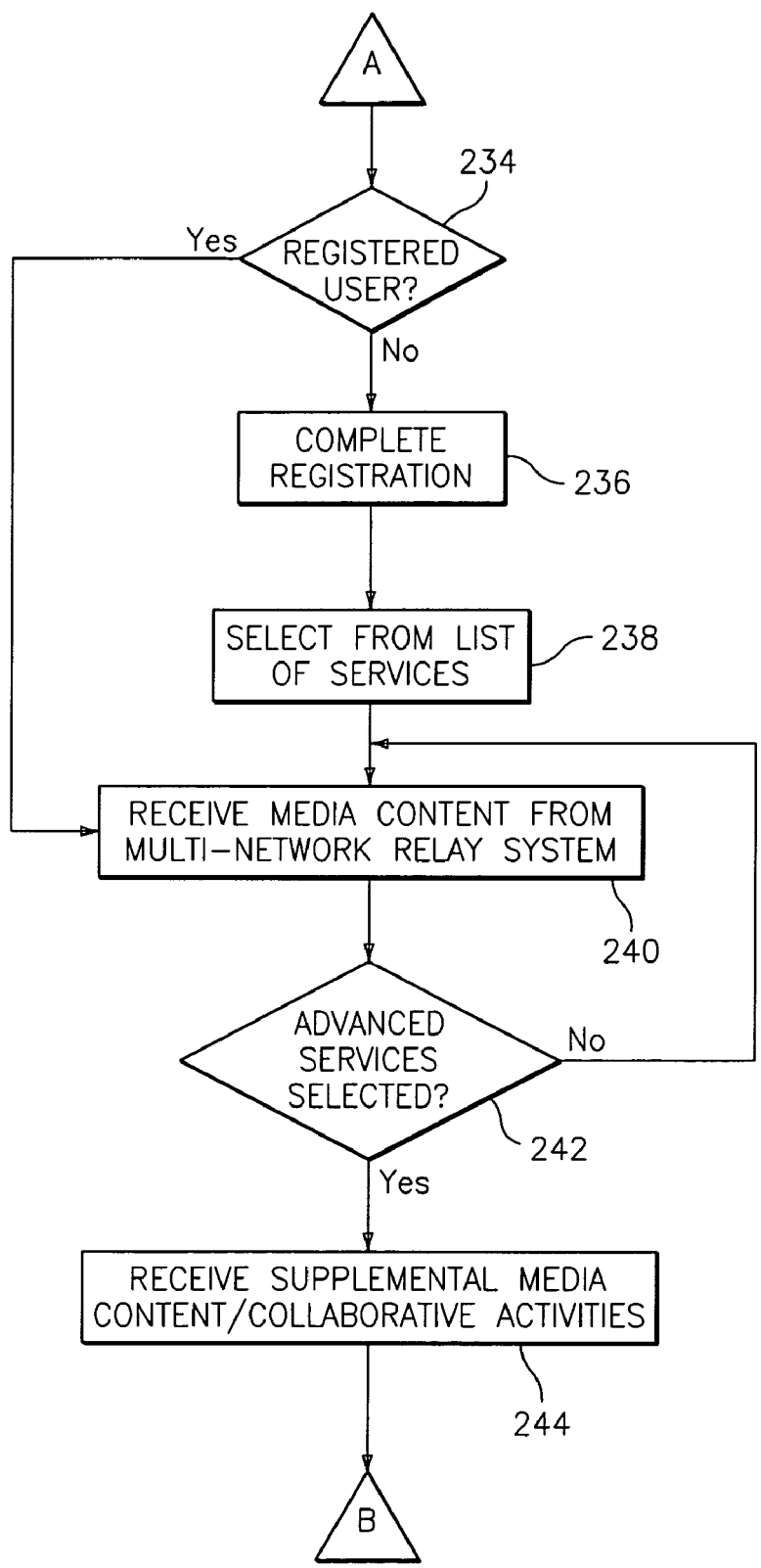

As described in FIGS. 2A and 2B, the multi-viewpoint media access system may be implemented entirely via a peer-to-peer system whereby portable communications devices discover and exchange media content at an event. If desired, these transmissions can also include sending the media content over a communications network (e.g., cell tower 106) to a remote communications device (e.g., 110). Other embodiments include a multi-network relay system and production system that may enhance the event experience by providing a potentially better quality transmission of the event, as well as additional services. Some of these services are also described in FIGS. 2A and 2B.

Figure 3:
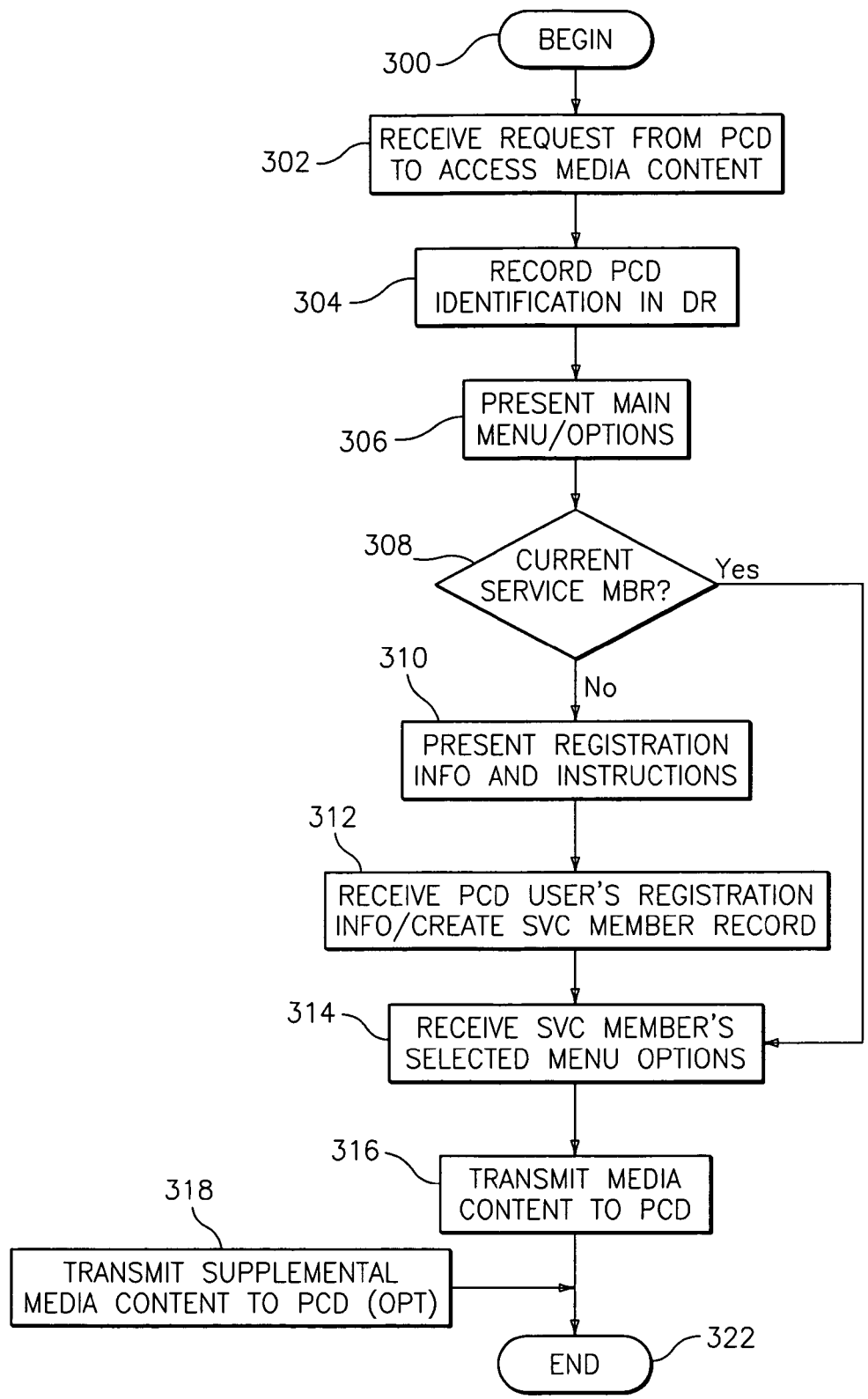
FIG. 3 is a flowchart describing a process for implementing the multi-viewpoint media access system by a service provider of the system in exemplary embodiments.

With an organized, central hosting system such as multi-network relay system 104, in cooperation with production system 114, a wide variety of services may be provided to portable communications device users. Hosting systems may include telecommunication service providers, Internet service providers, application service providers, and other commercial enterprises. FIG. 3 describes a process for implementing the multi-viewpoint media access system via multi-network relay system 104.

At 300, the process begins whereby a request to access media content provided by multi-network relay system 104 is received by server 120 at 302. Multi-network relay system 104 records identification information for the requesting portable communications device in data repository 122 at 304. Identification information may include the caller's phone number or electronic address (e.g., email). A main menu and options for the multi-viewpoint media access system are presented to the portable communications device at 306. A sample menu is shown in FIG. 4.

At 308, it is determined if the requesting portable communications device user is an existing service member. This may be accomplished by checking data repository 122 for the existence of a service member record for the user of the portable device. If the user is not currently registered, registration information and instructions are provided to the portable communications device user at 310. At 312, the portable communications device user's registration information is received at server 120 and a record for the service member is generated and stored in data repository 122. Other responses to menu options presented to the user are received at 316. For example, in addition to requesting personal information, the user may be queried to select from service options provided by the multi-viewpoint media access system such as a service package, or specific options including interactive polling capabilities as described above. Alternatively, if the requesting portable communications device user is a current service member at 308, these responses to menu options previously presented at 306 are received at 316. As indicated above, if media content services are offered to non-ticket holders such as remote communications device 110, the multi-network relay system 104 would establish this before transmitting the media content (e.g., in accordance with the entertainment property rights of the event performers and venue 102). The media content requested by the portable communications device user is then transmitted to the portable communications device at 318. If optional advanced services have been previously selected by the service member, supplemental media content and/or collaborative functions and activities are available to the user at 320 and the process ends at 322.

Further exemplary embodiments of the multi-viewpoint media access system make extensive use of techniques for data storage, compilation, editing, generation and production with respect to media content and related data. Generally, in these further embodiments, content feeds received from communications devices in attendance at an event are processed and made available for access by end users who may, or may not, be in attendance at the event, whereby the end users are provided with tools for viewing event-related content, modifying the content, and generating customized or personalized content. These services are referred to herein as multi-viewpoint media content services.

Figure 5:
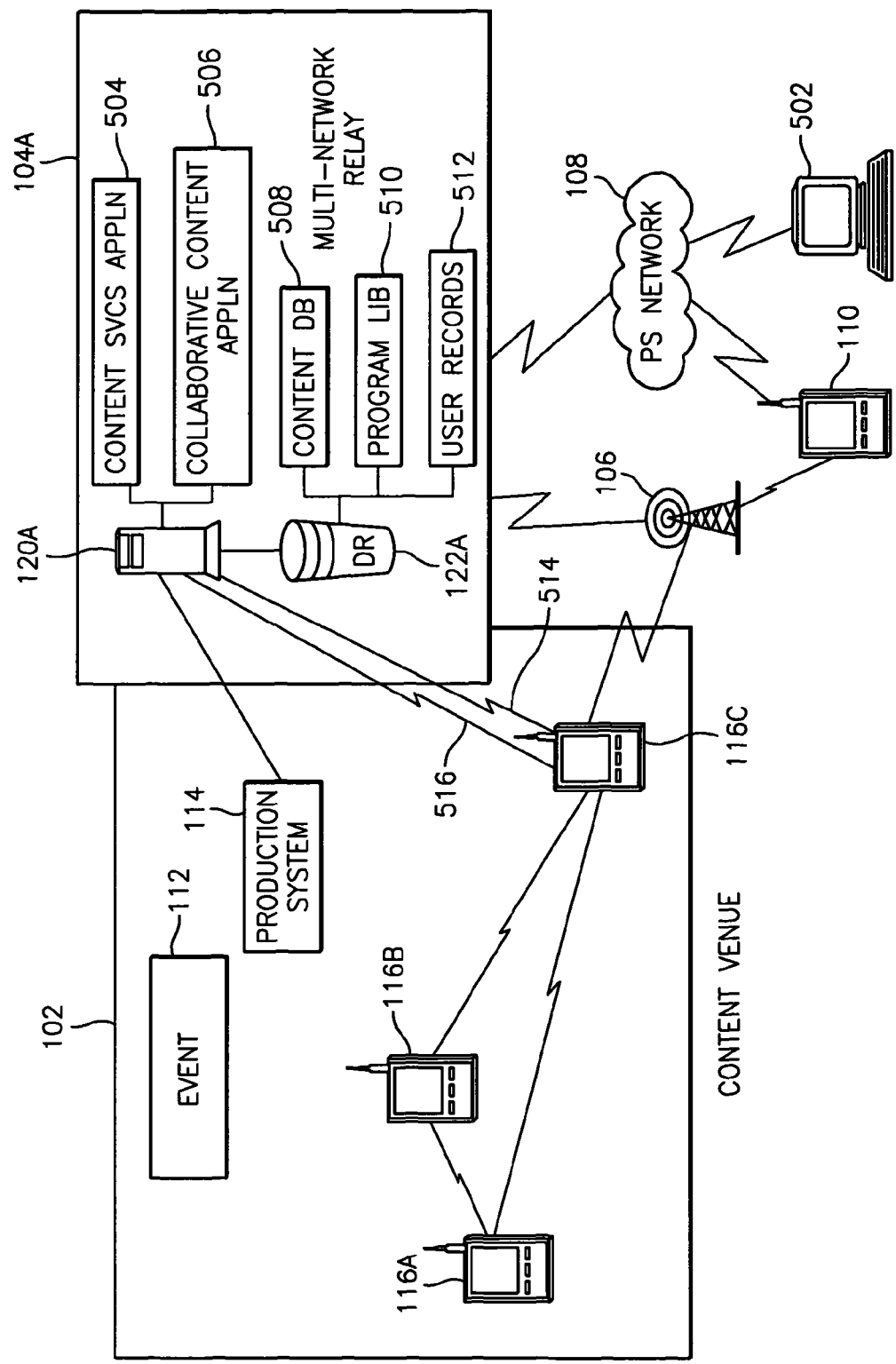
FIG. 5 is a block diagram of a system upon which multi-viewpoint media content and collaboration services may be implemented in exemplary embodiments.

The embodiments further enable event-goers to generate additional content (e.g., collateral content), which supplements the event-related content (i.e., collectively referred to as collaborative content or mixed content). This additional content may also be available to the end users. These services are referred to herein as multi-viewpoint media collaboration services. The event-related content may be archived for subsequent access (also referred to as "post production content"), live content, or a combination thereof. Turning now to FIG. 5, a system upon which the multi-viewpoint media content and collaboration services may be implemented in accordance with exemplary embodiments will now be described.

The system of FIG. 5 includes structures similar to those described in FIG. 1 and, to this extent, these structures will not be further described. In exemplary embodiments, the system of FIG. 5 includes a user system 502 in communication with server 120A and multi-network relay system 104A via network 108. In alternative exemplary embodiments, the user system may communicate with the multi-network relay system 104A via other types of networks (e.g., cell tower 106), depending upon the capabilities of the user system 502. The user system 502 may be implemented, e.g., via a general-purpose computer processing device including devices similar to communications devices 116A-116C. The user system 502 refers to an end user of the multi-viewpoint media content and collaboration services. In particular, end users such as user system 502 may access event-related content from data repository 122A via, e.g., a user interface and website provided by server 120A of the multi-viewpoint media content and collaboration services system. Alternatively, or in combination, the multi-viewpoint media content and collaboration services may be implemented using live data feeds. An end user of user system 502 may be a personal consumer of the multi-viewpoint media content and collaboration services or may be a business enterprise that utilizes the event-related content, along with its own advertising, business-related content (e.g., product or service information), or other content.

In exemplary embodiments, server 120A of multi-network relay system 104A executes applications for implementing the multi-viewpoint media content and collaboration services, namely a multi-viewpoint media content services application 504 (also referred to herein as "content services application") and a multi-viewpoint media collaborative content application 506 (also referred to herein as "collaborative content application"). The collaborative content application 506 enables event-goers (e.g., communications devices 116A-116C to provide supplemental or collateral content via a content feed (e.g., 516), in addition to the primary content targeted at the subject event (e.g., via content feed 514) as shown in FIG. 5. The content, either primary or secondary, may include content relayed among devices (e.g., communications devices 116A-116C). In exemplary embodiments, both of the applications 504 and 506 include a user interface. Server 120A may also implement applications including a web server and one or more editing tools and a library of content enhancements.

Data repository 122A stores archived content as event-related content in content database 508. End users may access the website provided by the server 120A, and search, retrieve, and manipulate event-related content stored in content database 508, creating customized content via content services application 504. For example, if the event 112 relates to a football game, and end user at user system 502 may desire to assemble portions of the football game taken from various viewpoints selected by the end user and create a personalized video or other product using selected types of media. Further, the editor tool enables the end user to further customize and manipulate his/her copies of the event-related content. Enhancements available to the event-related content may include user comments, audio, music, visual effects, branding, advertising, promotional information, logos, text, figures, overlays, banners, and subtitles. Alternatively, or in combination, the event-related content may be provided via live data feeds.

In exemplary embodiments, data repository 122A further includes a program library 510 and user records 512. Program library 510 stores customized content generated by end users as described further herein. User records 512 refer to database records storing end user information such that the multi-viewpoint media content and collaboration services can track and manage end users of the services.

Figure 6:
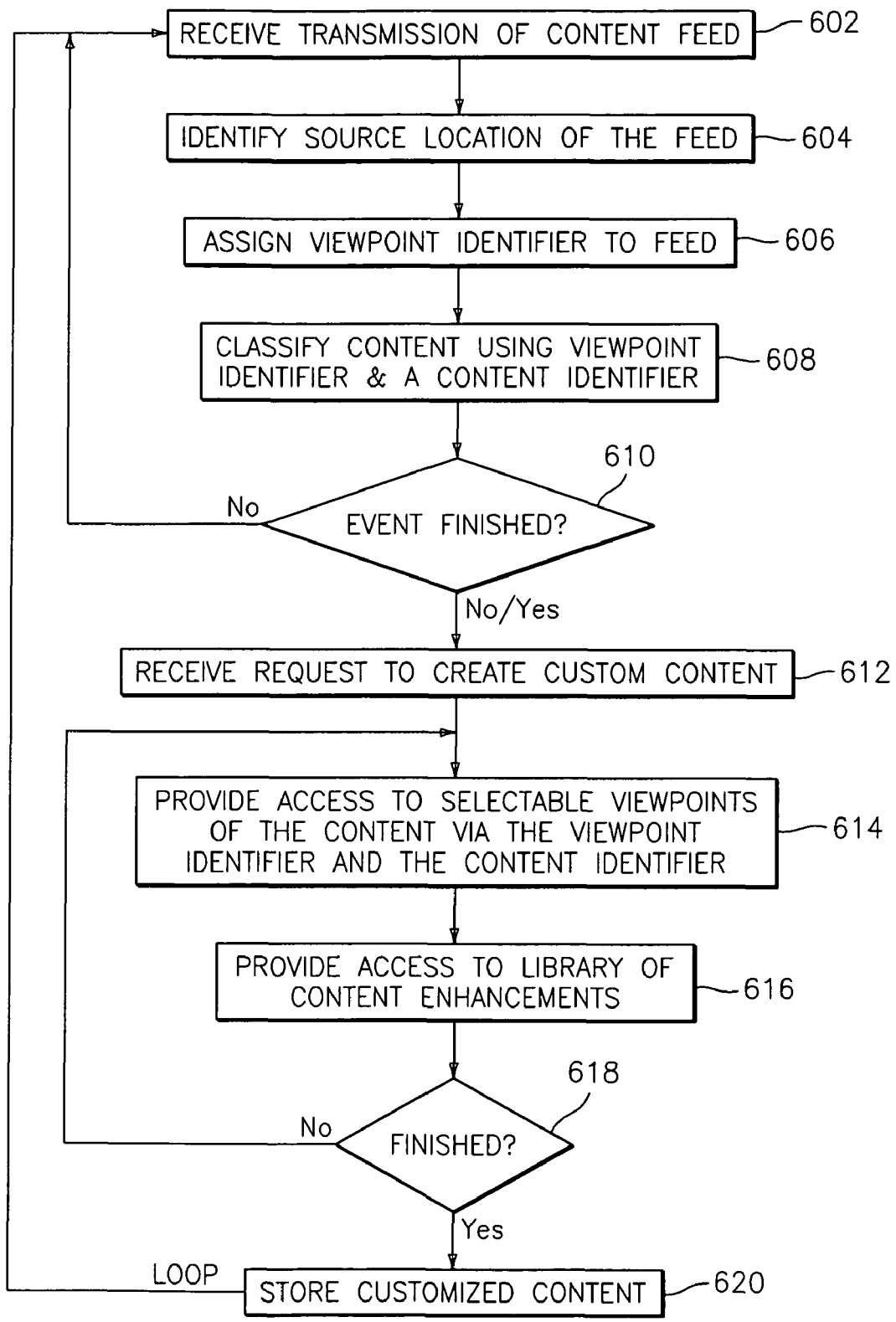
FIG. 6 is a flow diagram describing a process for implementing the multi-viewpoint media content services in exemplary embodiments.

Turning now to FIG. 6, a process for implementing the multi-viewpoint media content services will now be described in exemplary embodiments. At step 602, the server 120A receives a content feed (e.g., content feed 514) transmitted by communications devices, such as devices 116A-116C and/or production system 114. The content may include a video stream, a digital image, voice data, audio data, altitude, speed, physical coordinates, temperature, movement, biometric data, and/or sound, among others. As indicated above, the content may include content viewed and relayed among one or more communications devices (e.g., devices 116A-116C).

The content may be transmitted using various communications technologies including, e.g., wireless data transfer, over-the-air broadcast signaling, analog communications, etc. Also transmitted are identifiers that describe elements of the content. For example, the content feed may provide identifying information about the source of the content (e.g., type of device, location of device, time of transmission, as well as other data).

At step 604, the source location of the feed is identified. The source location may be obtained via the content feed itself (e.g., ascertaining the source by the particular viewpoint presented—e.g., first row behind home plate at the Yankees game; section A, row 12 at a concert hall). Alternatively, the geographic location of the event and the point of view may be ascertained, e.g., GPS data received from the devices 116A-116C. Alternatively, some of the geographic information may be pre-stored in data repository 122A.

Figure 7:
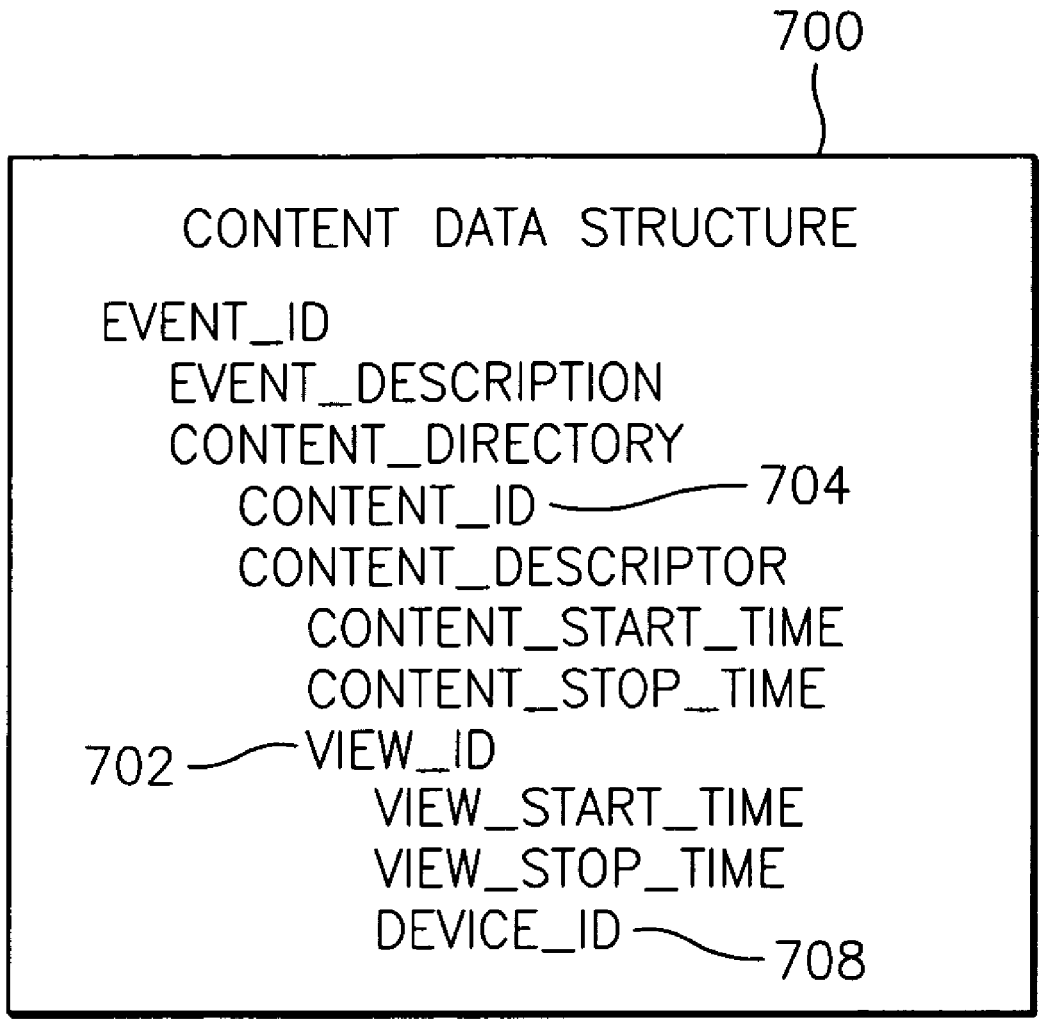
FIG. 7 is a sample data structure utilized by the multi-viewpoint media content services in exemplary embodiments.

At step 606, a viewpoint identifier is assigned to the data feed, which distinctly identifies the viewpoint and the content feed. The assignment may be implemented in various ways, such as assigning markers or tags to the content feed, either upon receipt of the feed or when the content is stored in database 508. A sample data structure utilized by the content services application 504 for assigning viewpoint identifiers is shown in FIG. 7. The data structure 700 of FIG. 7 illustrates various elements for classifying the content feed. As shown in data structure 700, a viewpoint identifier is assigned via VIEW_ID 702.

At step 608, the multi-viewpoint media content services classify the content from the feeds using, e.g., the content itself and the viewpoint identifier 702. For example, the content itself provides information regarding the event 112 (e.g., sports event, concert event, etc.) and also information regarding portions of the event, e.g., a song, an act, a person, time, etc. Step 608 includes classifying these portions of the event by content identifiers. As shown in data structure 700, a content identifier is assigned via CONTENT_ID 704. Each of the content feeds represents a viewpoint that is separately classified. Thus, each event may be broken down into logical content segments that are labeled using content identifiers. At step 610, it is determined whether the event has completed. If so, the process proceeds to step 612. If the event has not completed, the process returns to step 602 whereby the multi-viewpoint media content services continue to receive content transmissions. The process also continues to step 612 (i.e., whether or not the event has completed). This reflects the capabilities of a user to create custom content during a live event (e.g., while the event is occurring). In exemplary embodiments, the multi-viewpoint media content services also store the classified content in a database (e.g., content database 508 of FIG. 5) for later retrieval.

At step 612, a request to view content or create customized content is received. The end user may be a registered user of the multi-viewpoint media services. The registration may provide service packages that provide varying levels of services to the end user. These services may be facilitated via the user records 512 of FIG. 5.

If the event-related content is stored in content database 508, the content services application 504 provides access to the stored content at step 614. As described above, this access may occur via a website and user interface provided by the content services application 504. In addition, once an end user accesses selected content, the selected content may be copied to a designated storage location (e.g., in data repository 122A or downloaded to the user system 502) and the user's copy of the content may be manipulated and enhanced via editing tools 506 provided by the server 120A at step 616. In alternative exemplary embodiments, end users may be permitted to store their creations (i.e., customized content) in program library 510 of data repository 122A or other available network storage location and provide access to their creations to other end users who may be interested. These creations may include movies, film-clips, trailers, and excerpts, to name a few.

Alternatively, if the content is live media, the content stream is tagged with markers and time mapped to the event schedule via, e.g., a secure clock provided on the communications device providing the feed (using, e.g., an atomic clock) or other suitable means. The end user may then access the live data via the viewpoint identifier and content identifier that is presented in a timeline format for the end user.

In further exemplary embodiments, the end user may be provided with selected portions of the event-related content, such as the portions of the event identified in the user's record (i.e., user records 512). In this embodiment, during the event, a device identifier is transmitted by the communications device along with the content feed which identifies the registered user of user device 502. The device identifier is captured using the data structure 700 as DEVICE_ID 708. When the event is over, the user of the communications device providing the content feed (who may also be the user of user device 502) accesses the portions of event-related data corresponding to the content feed received from the communications device identified by the device identifier. In this manner, the end user may create customized content that includes portions of his/her own content feed.

In alternative exemplary embodiments, the end user may desire to view selected portions of the event-related content but not download or otherwise manage the content.

At step 618, it is determined whether the end user is finished. If not, the process returns to step 614 and the user is presented with further access to the content. Otherwise, the end user is prompted to store the customized content at step 620, either on the network or locally in user device 502. A sample user interface depicting an event timeline with content viewpoint selections available to a user is shown in FIG. 8.

Figure 8:
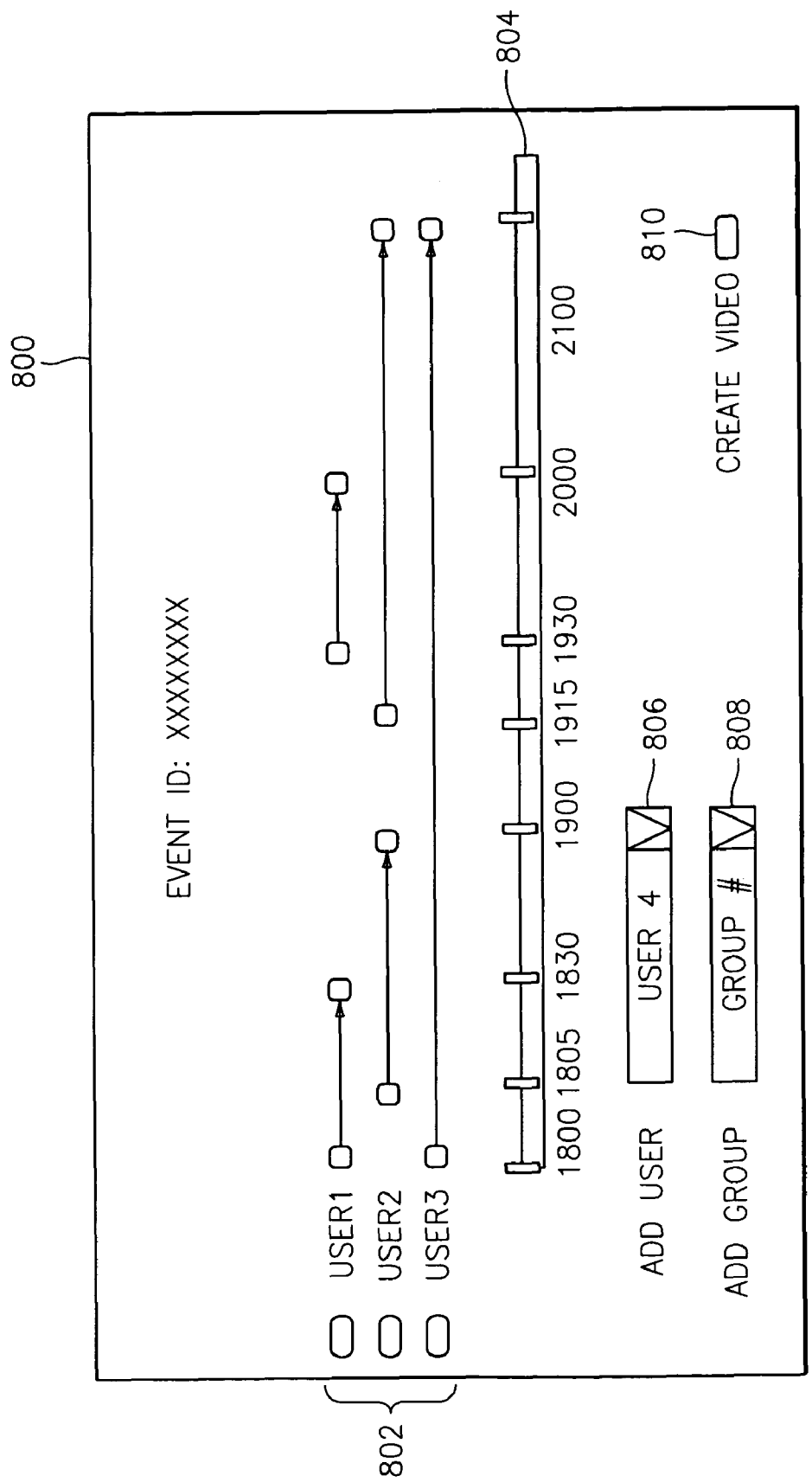
FIG. 8 is a user interface screen including a timeline of content viewpoints provided by the multi-viewpoint media content and collaboration services in exemplary embodiments.

Turning now to the user interface screen 800 of FIG. 8, a user has selected an event for which custom content generation is desired. As shown in the user interface screen 800, there are three viewpoint selections 802 with respect to the event, which follow a timeline 804 for the event. The first viewpoint reflects a content feed from a communications device that reflects a portion of the event taken from 1800 through 1829 (6:00 p.m. through 6:29 p.m.) and then another feed taken from 1930 through 2000 (7:30 p.m. through 8:00 p.m.). The user may select from one or more of the content viewpoints 802, or may access additional viewpoints by selecting a user from a drop down window 806. Alternatively, the user may select a group of user viewpoints via window 808. The groups refer to a community of users that may be defined by users (e.g., a group of friends), a physical location at the event from which the content is received (e.g., content from communications devices located at a specific area within the event location), or other type of grouping. Once the selections are made, the user selects CREATE VIDEO 810 in order to customize the content selections.

As indicated above, the multi-viewpoint media collaboration services enable event-goers to generate additional content (e.g., collateral content), which supplements the event-related content (i.e., collectively referred to as collaborative content or mixed content). This additional content may also be available to the end users. The collateral content may be transmitted via a second content feed via the communications device. For example, an event-goer broadcasting a portion of the event may submit an audio commentary into the communications device, which is then transmitted to the server 120A as a second content feed (e.g., content feed 516). Extraneous or collateral content may be transmitted by the event-goer as well. For example, an interesting person, scene, action, etc. that occurs during the event may be captured via the communications device. This type of content is referred to herein as collateral content in order to distinguish it from the content directed at the event itself (i.e., event 112). The collaborative content application 506 processes the content feeds including the collateral content, which results in collaborative content, that is, event-related content supplemented with collateral content provided by communications devices at the event.

Figure 9:
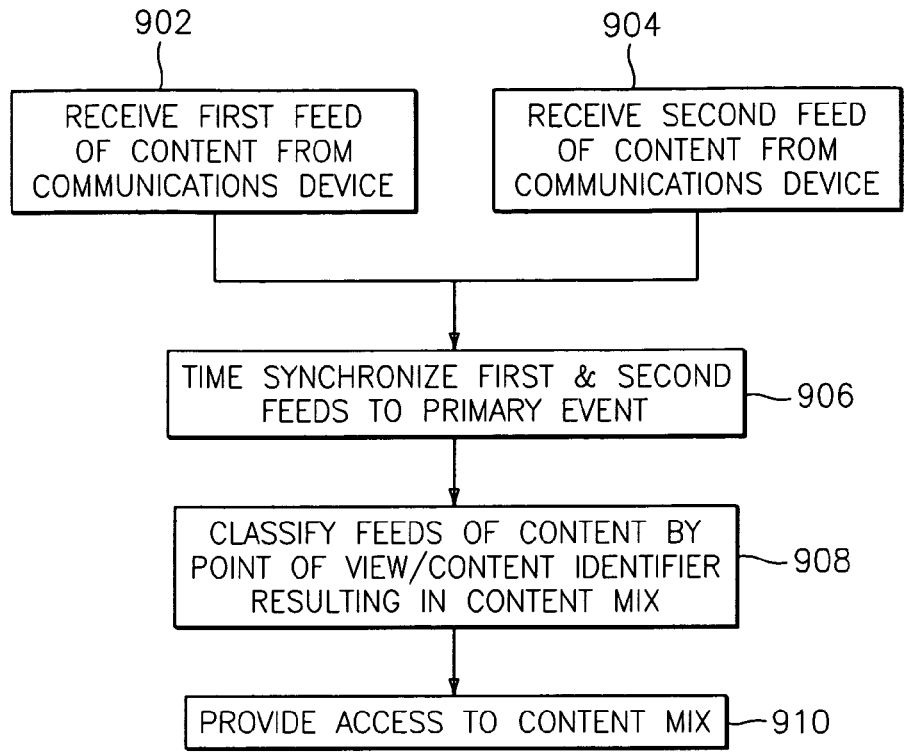
FIG. 9 is a flow diagram describing a process for implementing the multi-viewpoint media collaboration services in exemplary embodiments.

Turning now to FIG. 9, a flow diagram describing a process for implementing the content collaboration services will now be described in exemplary embodiments. In steps 902 and 904, which may occur simultaneously or in any order, a first and second feed of content are received from a communications device. The first feed of content refers to a primary event (i.e., event 112). The second feed of content refers to the collateral content provided by the communications device. It should be appreciated that two content feeds are descried here for simplicity of explanation but that any number of content feeds may be used. For example, there may be any number of feeds referring to one or more primary events and any number of feeds referring to collateral content.

At step 906, the collaborative content application 506 time synchronizes the first and second feeds with the event schedule. For example, if the event schedule runs from 6:00 p.m. through 9:00 p.m. (e.g., as shown in the event depicted in FIG. 8), the time coordinates identified in the feeds are synchronized to corresponding portions of the event. These time coordinates may be obtained using similar methods as described above in FIG. 6.

Figure 10:
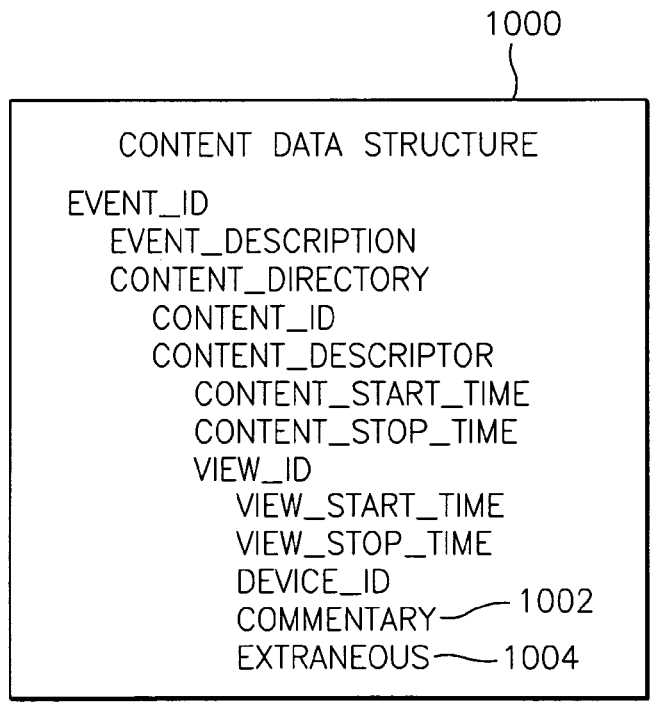
FIG. 10 is a sample data structure utilized by the multi-viewpoint media collaboration services in exemplary embodiments.

At step 908, the feeds of content are classified according to point of view. A sample data structure utilized by the collaborative content application 506 for classifying content is shown in FIG. 10. As shown in the data structure 1000 of FIG. 10, the secondary, or collateral content may be marked or tagged using COMMENTARY 1002 and EXTRANEOUS 1004. The term 'extraneous' is used synonymously herein with the term 'collateral'. The classification scheme employed may be similar to that referenced above in FIG. 6. The content resulting from the collaboration processes described in FIG. 9 is referred to herein as a 'content mix'. The content mix may be stored in content database 508.

At step 910, the collaborative content application 506 provides end users with access to the content mix. End users may view, edit, manipulate, and enhance portions of the content mix to generate customized content using editing tools in a similar manner to that described above in FIG. 6. Thus, some of the features described in the flow diagram of FIG. 6 may be utilized by the collaborative content application 506 as desired. Likewise, a portion of the features described in the flow diagram of FIG. 9 may be utilized by the content services application 504.

As described above, the exemplary embodiments can be embodied in the form of computer-implemented processes and apparatuses for practicing those processes. The exemplary embodiments can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The exemplary embodiments can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing multi-viewpoint media content services, comprising:
　receiving, at a centralized server, live feeds of content from a first end user device and a second end user device that are observing an event from different viewpoints;
　classifying, by the centralized server, each of the live feeds of content received from the first and second end user devices according to viewpoint identifiers of the live feeds of content, device identifiers of the first and second end user devices, and content identifiers, each of the content identifiers specifying a defined portion of the event;
　providing the first and second end user devices with access to user-selectable viewpoints of the live feeds of content via the viewpoint identifiers, the device identifiers, and the content identifiers, the user-selectable viewpoints including the first and second end user devices' own content provided via the live feeds of content, and the live feeds of content associated with the user-selectable viewpoints are modifiable for creating customized content; and
　modifying content of user-selected viewpoints from the live feeds of content by combining the content of the user-selected viewpoints to follow a time sequence corresponding with a timeline of the event, the combining resulting in the customized content.

2. The method of claim 1, further comprising:
identifying a source location of each of the different viewpoints;
assigning the viewpoint identifiers to the different viewpoints in response to the identifying;
receiving time signals from the first and second end user devices, each of the time signals specifying a time of transmission of the live feeds of content; and
mapping the viewpoint identifiers to respective content identifiers via the time signals.

3. The method of claim 1, further comprising:
storing classified content in a database including begin and end times and duration of the classified content; and
mapping the viewpoint identifiers to the content identifiers via the begin and end times;
wherein providing the first and second end user devices with access to the user-selectable viewpoints further includes providing access to post-production media.

4. The method of claim 1, further comprising receiving the device identifiers of the first and second end user devices, wherein the classifying includes classifying the live feeds of content according to the device identifiers, and the providing the first and second end user devices with access to the user-selectable viewpoints of the live feeds of content includes providing access to viewpoints of the live feeds of content that correspond to a data feed provided by the first and second end user devices via respective device identifiers.

5. The method of claim 1, wherein portions of the event are defined by:
parsing data received from the live feeds of content;
identifying logical content segments responsive to the parsing;
applying time-based parameters to each of the logical content segments; and
associating a content descriptor with the content identifiers.

6. The method of claim 1, wherein
the first and second end user devices are each portable communications devices.

7. The method of claim 1, further comprising providing content enhancements for creating the customized content, the content enhancements including advertising, and the live feeds of content include digital video streams.

8. The method of claim 1, wherein the live feeds of content include
biometric data corresponding to the event.

9. The method of claim 1, wherein modifying the content of the user-selected viewpoints includes providing access to a website storing event-related content, wherein the first and second end user devices create the customized content by combining the content of the user-selected viewpoints with selected event-related content from the website.

10. The method of claim 9, wherein the website storing the event-related content includes a program library of customized content created by a plurality of end user devices, and wherein creating the customized content includes combining the customized content from the plurality of end user devices with the user-selected viewpoints.

11. The method of claim 1, further comprising:
receiving, at the centralized server, a live feed of content from a production system that is observing the event; and
providing the first and second end user devices with access to a viewpoint corresponding to the live feed of content received from the production system,
wherein modifying the content of the user-selected viewpoints includes combining the content of the user-selected viewpoints with content from the production system.

12. A system for providing multi-viewpoint media content services, comprising:
a computer processing device in communication with a first end user device and a second end user device over a network; and
a multi-viewpoint media access application executing on the computer processing device, performing:
receiving live feeds of content from the first and second end user devices the first and second end user device observing an event from different viewpoints;
classifying each of the live feeds of content received from the first and second end user devices according to viewpoint identifiers of the live feeds of content, device identifiers of the first and second end user devices, and content identifiers, each of the content identifiers specifying a defined portion of the event;
providing the first and second end user devices with access to user-selectable viewpoints of the live feeds of content via the viewpoint identifiers, the device identifiers, and the content identifier, wherein the user-selectable viewpoints including the first and second end user devices' own content provided via the live feeds of content, and the live feeds of content associated with the user-selectable viewpoints are modifiable for creating customized content; and
modifying content of user-selected viewpoints from the live feeds of content by combining the content of the user-selected viewpoints to follow a time sequence corresponding with a timeline of the event, the combining resulting in the customized content.

13. The system of claim 12, wherein the multi-viewpoint media access application further performs:
identifying a source location of each of the different viewpoints;
assigning the viewpoint identifiers to the different viewpoints in response to the identifying;
receiving time signals from the first and second end user devices, each of the time signals specifying a time of transmission of the live feeds of content; and
mapping the viewpoint identifiers to respective content identifiers via the time signals.

14. The system of claim 12, further comprising a database in communication with the computer processing device, the multi-viewpoint media access application further performing:
storing classified content in the database including begin and end times and duration of the classified content; and
mapping the viewpoint identifiers to the content identifiers via the begin and end times;
wherein providing the first and second end user devices with access to the user-selectable viewpoints further includes providing access to post-production media.

15. The system of claim 12, wherein the multi-viewpoint media access application further performs:
receiving the device identifiers of the first and second end user devices, wherein the classifying includes classifying the live feeds of content according to the device identifiers, and the providing the first and second end user devices with access to the user-selectable viewpoints of the live feeds of content includes providing access to viewpoints of the live feeds of content that corresponds to a data feed provided by the first and second end user devices via respective device identifiers.

16. The system of claim 12, wherein portions of the event are defined by:
  parsing data received from the live feeds of content;
  identifying logical content segments responsive to the parsing;
  applying time-based parameters to each of the logical content segments; and
  associating a content descriptor with the content identifiers.

17. The system of claim 12, wherein the first and second end user devices are each portable communications devices.

18. The system of claim 12, wherein the multi-viewpoint media access application further performs:
  providing content enhancements for creating the customized content, the content enhancements including advertising, and the live feeds of content include digital video streams.

19. A computer program product for providing multi-viewpoint media content services, the computer program product including a computer-readable storage medium having instructions embodied thereon, which when executed by a computer processor cause the computer process to implement a method, the method comprising:
  receiving live feeds of content from a firs end user device and a second end user device that are observing an event from different viewpoints;
  classifying each of the live feeds of content received from the first and second end user devices according to viewpoint identifiers of the live feeds of content, device identifiers of the first and second end user devices, and content identifiers, each of the content identifiers specifying a defined portion of the event;
  providing the first and second end user devices with access to user-selectable viewpoints of the live feeds of content via the viewpoint identifiers, the device identifiers, and the content identifiers, the user-selectable viewpoints including the first and second end user devices' own content provided via the live feeds of content, and the live feeds of content associated with the user-selectable viewpoints are modifiable for creating customized content; and
  modifying content of user-selected viewpoints from the live feeds of content by combining the content of the user-selected viewpoints to follow a time sequence corresponding with a timeline of the event, the combining resulting in the customized content.

20. The computer program product of claim 19, further comprising instructions for implementing:
  identifying a source location of each of the different viewpoints;
  assigning the viewpoint identifiers to the different viewpoints in response to the identifying;
  receiving time signals from the first and second end user devices, each of the time signals specifying a time of transmission of the live feeds of content; and
  mapping the viewpoint identifiers to respective content identifiers via the time signals.

21. The computer program product of claim 19, further comprising instructions for implementing:
  storing classified content in a database including begin and end times and duration of the classified content; and
  mapping the viewpoint identifiers to the content identifiers via the begin and end times;
  wherein providing the first and second end user devices with access to the user-selectable viewpoints further includes providing access to post-production media.

22. The computer program product of claim 19, further comprising instructions for implementing:
  receiving the device identifiers of the first and second end user devices, wherein the classifying includes classifying the live feeds of content according to the device identifiers, and the providing the first and second end user devices with access to the user-selectable viewpoints of the live feeds of content includes providing access to viewpoints of the live feeds of content that corresponds to a data feed provided by the first and second end user devices via respective device identifiers.

23. The computer program product of claim 19, wherein portions of the event are defined by:
  parsing data received from the live feeds of content;
  identifying logical content segments responsive to the parsing;
  applying time-based parameters to each of the logical content segments; and
  associating a content descriptor with the content identifiers.

24. The computer program product of claim 19, further comprising instructions for providing content enhancements for creating the customized content, the content enhancements including advertising, and the live feeds of content include digital video streams.

* * * * *